(12) United States Patent
Gorthi et al.

(10) Patent No.: US 8,352,446 B2
(45) Date of Patent: Jan. 8, 2013

(54) METHOD FOR OBJECTCLASS VERSIONING

(75) Inventors: Ramakrishna J. Gorthi, Maharashtra (IN); Prashant Srivastava, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 12/362,088

(22) Filed: Jan. 29, 2009

(65) Prior Publication Data

US 2010/0191781 A1    Jul. 29, 2010

(51) Int. Cl.
*G06F 7/00*    (2006.01)
*G06F 17/30*    (2006.01)

(52) U.S. Cl. ........................................ 707/695; 707/822
(58) Field of Classification Search .................. 707/695, 707/999.203
See application file for complete search history.

(56) References Cited

U.S. PATENT DOCUMENTS

| | | | | |
|---|---|---|---|---|
| 6,324,587 | B1 * | 11/2001 | Trenbeath et al. | 719/310 |
| 6,564,370 | B1 | 5/2003 | Hunt | |
| 6,915,340 | B2 * | 7/2005 | Tanaka | 709/220 |
| 2003/0018964 | A1 | 1/2003 | Fox et al. | |
| 2004/0107125 | A1 * | 6/2004 | Guheen et al. | 705/7 |
| 2004/0117350 | A1 | 6/2004 | Cavage et al. | |
| 2004/0158575 | A1 * | 8/2004 | Jacquemot et al. | 707/102 |

OTHER PUBLICATIONS

KMR Group Blog. http://kmr.nada.kth.se/blog/?p=33.

* cited by examiner

*Primary Examiner* — Belinda Xue
(74) *Attorney, Agent, or Firm* — Yee & Associates, P.C.; Jeffrey S. LaBaw

(57) ABSTRACT

Techniques for objectclass versioning in directory server schema are provided. The techniques include migrating from one version of a directory server to another version of the directory server, maintaining one or more versions of an objectclass while migrating from one version of a directory server to another version of the directory server, and selecting one of the one or more versions of an objectclass for normal functioning of an application.

17 Claims, 1 Drawing Sheet

METHOD FOR OBJECTCLASS VERSIONING

FIELD OF THE INVENTION

The present invention generally relates to information technology, and, more particularly, to objectclass versioning in directory servers.

BACKGROUND OF THE INVENTION

Lightweight directory access protocol (LDAP) is an open industry standard defining a standard method for accessing and updating information in a directory. LDAP has gained wide acceptance as the directory access method of the internet and is therefore also becoming strategic within corporate intranets. It is being supported by a growing number of software vendors and is being incorporated into a growing number of applications.

A directory is basically a read-centric repository, wherein customers can store any kind of data they are permitted to see such as, for example, users, applications, files, printers, network resources, etc. With time and age, the needs of the customers have been increasing with regards to the feature-set a given directory server deployment provides. To work with the new feature set, customers need to migrate to the new version of the directory server. In a typical customer deployment, not all products would support migration. There can be some products which are tightly connected to the older version of the directory server. Migration of the directory server would need a migration of dependent products because of schema dependency.

Given a customer deployment, there can be 'n' number of products to have the solution fully functional. Assume that the deployment includes products A, B, C and D. The deployment also has a directory server component. Let's, as an example, refer to the directory server component as DSv1. The development team works on some new features and comes out with a new release of the directory server, for example, DSv2. Customers find the feature set in DSv2 quite interesting and they are keen to use the same and increase their product value. However, there are schema changes from DSv1 and DSv2 to support the new features introduced in DSv2. This forms a hindrance in migration. In the current product deployment, products A, C work with DSv2, but products B and D do not work with DSv2, rather they work only with DSv1. The migration, therefore, cannot go ahead-because all the products cannot be migrated.

The entire deployment can be migrated to make all four products work with DSv2. One-way to achieve this would be to upgrade B and D. However, this would mean that the customer has to invest further to upgrade B and D. Customers may not like this and may refrain from migration. However, to make B and D work with DSv2, one needs to ensure that the schemas of DSv1 and DSv2 are available in a single directory server instance, whereafter products can work with either of the schemas based upon their needs.

Existing approaches include versioning that is from a directory entry perspective, rather than at the schema level. Schema, as will be described below, is the backbone of entries in a directory server. Schema includes attributes and object-classes. A directory entry is an instance of an objectclass. The attributes in the entries are the ones to which users can assign values.

SUMMARY OF THE INVENTION

Principles of the present invention provide techniques for objectclass versioning. An exemplary method (which may be computer-implemented) for objectclass versioning in directory server schema, according to one aspect of the invention, can include steps of migrating from one version of a directory server to another version of the directory server, maintaining one or more versions of an objectclass while migrating from one version of a directory server to another version of the directory server, and selecting one of the one or more versions of an objectclass for normal functioning of an application.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
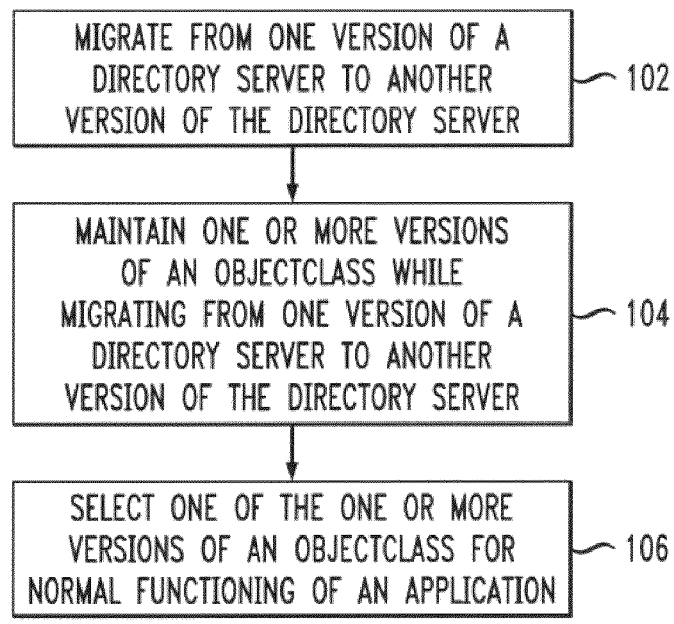
FIG. 1 is a flow diagram illustrating techniques for objectclass versioning in directory server schema, according to an embodiment of the present invention.

Principles of the present invention include objectclass versioning in directory server schema. One or more embodiments of the invention achieve the ability in an LDAP repository to store multiple versions of an object, helping to maintain multiple objectclass versions. A given directory server instance can have 'n' versions of a given objectclass starting from version 1 to version 'n'. A given product can work with a given version of the objectclass based upon the attributes with which it is compatible.

The techniques described herein disclose how objectclass versioning can help customers migrate to the latest version of the directory server despite the fact that some of the products gel better with the previous version of the directory server. The migration could be conducted without mandating the dependent products to migrate for want of schema.

As such, one or more embodiments of the invention include migration from one version to another version of a directory server involving schema changes. Additionally, multiple versions of an objectclass can be maintained in a single directory server instance. After migrating one version of directory server to another, a product can select one of the versions of an objectclass for its normal functioning. Thereby, even if the new version of the directory server does not support the product, the product can still choose an old version of the objectclass which is appropriate for its functioning. Further, unlike disadvantageous existing approaches noted above, one or more embodiments of the present invention specifically maintain multiple versions of an objectclass when moving from one version of database server to another version of database server.

Also, the per-application mapping information for a given objectclass can be deduced autonomously, and users would not be required to provide any mapping information on their own. One or more embodiments of the invention additionally include objectclass versioning that is configurable. As such, if customers do not want it, versioning can be turned off.

The techniques described herein facilitate applications to choose the version of the objectclass they want. There can be a per-application objectclass map maintained with the directory server. Applications can pass a unique identifier with each client request to denote the map they want to use. Therefore, each application has greater control in deciding the appropriate map.

One or more embodiments of the invention can implement versioning by way of a per-application objectclass map. The map is stored as entries in the directory server, as opposed to disadvantageously including a separate set of schema files for storing the mapping information, or including an additional component that would store the mapping information between the objectclass being used by a given application and the actual objectclass version to be used in the back-end directory server. Further, the techniques described herein do not have a pre-requisite of separate directories for storing different objectclasses and/or schema, nor do they have any kind of a proxy server to associate a given client with different versions of the objectclasses.

One or more embodiments of the invention implement changes at the schema level and include different approaches to implement objectclass versioning, as described below. Versioning can be in such a way, for example, that it would not break the existing deployments of the directory server. Given this, it would be quite easy for products to interact with the directory server, post migration. As such, post migration, products can choose which version of the objectclass they can gel with and use the same. Consequently, without changing much of the products in the deployment, the customer can migrate to the latest version of the directory server. In other words, customers can enjoy the latest feature set of the directory server without troubling the other products in the deployment.

Additionally, in one or more embodiments, objectclasses versioning is only applicable to the objectclasses that can actually be modified and not for objectclasses that cannot be modified, thereby ensuring conformance with the LDAP requests for comments (RFCs).

For illustration purposes, consider the following example. In a typical customer deployment, there are products A, B, C and D. There is a directory server DSv1. A new directory server DSv2 has come to the market. Customer wants to migrate to directory server DSv2 to exploit the new feature set of the directory server. However, while A and C work with DSv2, B and D cannot. The reason why B and D cannot work with DSv2 is explained as follows:

DSv1 has an objectclass with the following definition:
objectClasses=(objClass-oid NAME 'objClass' DESC 'A test objectclass.' SUP top STRUCTURAL MUST cn MAY (businessCategory $ description $ member $ o $ ou $ owner $ seeAlso)).

DSv2 has an updated definition of the same objectclass as follows:
objectClasses=(objClass-oid NAME 'objClass' DESC 'A test objectclass.' SUP top STRUCTURAL MUST (cn $ newAttr) MAY (businessCategory $ description $ member $ o $ ou $ owner $ seeAlso)).

The difference in terms of the objectclasses is marked in bold above. In DSv2, the objectclass 'objClass' has a new mandatory attribute 'newAttr'.

The products A, B, C and D have specific schema requirements from the directory server. The introduction of the attribute newAttr does not impact A and C much because they have a flexible schema. Their schema can be upgraded quite easily to include the new attribute. However, products B and D have a problem with the schema. They cannot talk to DSv2 because of the introduction of newAttr in the schema. Consequently, migration of the directory server is quite likely to break the deployment.

A solution, for example, can include as follows. In the migrated version of the directory server, there will be two versions of the object class 'objClass'. The base version will be the one that is shown against DSv2. The base version will be same as version 1 of the objectclass. The second version of objClass will be the one that is picked up from DSv1. If there are any other versions of the objectclass, they will be stored as incremental versions from there on. A given directory server instance can have 'n' versions of a given objectclass starting from version 1 to version 'n'. A given product can work with a given version of the objectclass based upon the attributes with which it is compatible.

Here is how an entire exemplary solution would work. Again, consider the example objectClasses mentioned above. DSv1 has an objectclass with the following definition:
objectClasses=(objClass-oid NAME 'objClass' DESC 'A test objectclass.' SUP top STRUCTURAL MUST cn MAY (businesscategory $ description $ member $ o $ ou $ owner $ seeAlso)).

DSv2 has an objectclass with the following definition:
objectClasses=(objclass-oid NAME 'objClass' DESC 'A test objectclass.' SUP top STRUCTURAL MUST (cn $ newAttr) MAY (businessCategory $ description $ member $ o $ ou $ owner $ seeAlso)).

During migration, if there is a difference between a given objectclass in DSv1 versus DSv2, multiple versions of the objectclass would be stored in DSv2 as follows:
objectClasses=(objClass_1-oid NAME 'objClass_1' DESC 'A test objectclass.' SUP top STRUCTURAL MUST (cn $ newAttr) MAY (businessCategory $ description $ member $ o $ ou $ owner $ seeAlso)).
objectClasses=(objClass_2-oid NAME 'objClass_2' DESC 'A test objectclass.' SUP top STRUCTURAL MUST cn MAY (businesscategory $ description $ member $ o $ ou $ owner $ seeAlso)).

Note that base objClass of DSv2 is the same as version 1. One need not have a separate objectclass having the name as mentioned in DSv2's standard schema.

If the product development happens with DSv1 and there are five versions of the directory server thereafter in which a given objectclass definition changes three times, then in the latest version of the product, that is, say DSv5, there will be objClass_1, objClass_2 and objClass_3 as the objectclasses in the schema, each of which carrying the definition for different versions of the directory server.

As described herein, objectclass versioning can be made configurable using the following attributes:
objectClassVersioning: TRUE/FALSE.
objectClassVersionChasing: TRUE/FALSE.

If objectClassVersioning is set to TRUE, during migration, multiple versions of a given objectclass are created. If objectClassVersioning is set to FALSE, during migration, multiple versions of a given objectclass are not created and only the latest copy of the objectclass is maintained.

If objectClassVersionChaining is set to true, during a given LDAP operation as and when a schema conformance check is made, the first attempt would be made to check if the base version of a given objectclass matches. If the base version does not match, the higher version of the objectclass is picked up for conformance check. The process can be repeated either until a conformant objectclass is found or until the list is exhausted. If the objectclass version list exhausts, the schema conformance check is marked as a failure.

If objectClassVersionChaining is set to false, during a given LDAP operation, when a schema conformance check is placed, only the base version of the objectclass is picked up for the check. If the conformance check fails, the operation is tagged to have failed.

An implementation of the object versioning feature by a given directory server can save significant migration efforts of products because a directory server can abstract the schema for different products based upon their conformance, and consequently make the overall deployment more manageable. Customers will be greatly assisted as a directory server migration need not be followed by the migration in a set of dependent products.

As far as the schema is considered, multiple versions can be created in the same manner as was explained earlier (that is, if an objectclass objClass was to be stored in multiple versions it would be stored as objClass_1,objClass_2, etc.). objClass_1 would correspond to the base version of the objectclass for a given directory server. This storage would, however, be transparent to users. A user would believe that he is adding an instance of objClass, whereas internally the directory server may store the entry as an instance of objClass_1 or objClass_2, depending upon the schema conformance.

One or more embodiments of the invention include different approaches to use the multiple versions of the objectclasses in LDAP operations. For example, one approach (for example, for stand-alone products) expects users and/or customers to enter the version of the objectclass they want to use for a specific operation (that is, expose the underlying objectclass versioning system to customers and ask them to provide the objectclass of the right version).

Also, another approach can include maintaining a per-application map to relate an objectclass with the objectclass to be replaced in place of it. For example, assume an application A1 requires version 2 of objClass (that is, objClass_2) and another application A2 requires version 3 of objClass (that is, objClass_3). The directory server will hold a map for A1, using which all references for objClass would be replaced by objClass_2 in all operations originating from A1. The directory server will hold a map for A2, using which all references for objClass would be replaced by objClass_3 in all operations originating from A2.

Additionally, another approach (for example, for applications that act as clients to a directory server) can include, for example, expecting applications to maintain the map mentioned in the approach above. Consequently, directory server will not maintain any mapping information. It would expect all client requests to already contain the right version of the objectclass.

Further, in yet another approach, each time an LDAP operation is fired, the server will query the schema for the list of objectclasses that are versions of the objectclass in the given entry. Once the list of objectclasses is known, a schema conformance check can be made to see if the base version of the objectclass from the schema matches the entry. If the base version does not match, the higher version of the objectclass is picked up for conformance check. The process is repeated either until a conformant objectclass is found or until the list is exhausted.

An illustrative embodiment of the present invention includes mapping information between a given objectclass and the objectclass to be replaced in place of this objectclass for operations originating from a given application. As described herein, mapping information can include application information and objectclass mapping information. With application information, for example, the directory server will maintain an entry per application that is using the directory server. The directory administrator would have the flexibility of creating an independent entry per application and adding the requisite information thereto.

The format of the entry to store information pertaining to each application can be, for example, as follows:

```
dn: cn=application1,cn=localhost
objectclass: container
description: "Schema mapping for Tivoli Identity Manager"
dn: cn=application2,cn=localhost
objectclass: container
description: "Schema mapping for Tivoli Access Manager"
```

The distinguished name (DN) (that is, the qualified name for an entry in the LDAP directory) of the entry would be the key for client applications to refer to the schema they want to use. For example, while adding a set of entries, if a user expects that the server should interpret the entries as per the schema mapping under "cn=application1, cn=localhost," this is how he could fire the ldapadd command:

ldapadd−D   cn=root-w   root−sD   "cn=application1, cn=localhost"−f test.ldif

This command is written assuming the fact that the support for the schema map would be through the argument "sD". Also, the user is required to remember just the application ID (identifier), and is not required to be aware of the individual objectclass versions to be used for an operation to get through.

With objectclass mapping information, the mapping information can be stored under cn=application1,cn=localhost, for example, as follows:

```
dn: cn=objClass, cn=application1, cn=localhost
objectclass: schemaMap
cn: objClass
targetObjectClass: objClass_2
dn: cn=objClass, cn=application2, cn=localhost
objectclass: schemaMap
cn: objClass
targetObjectClass: objClass_3
```

As such, the directory server is supposed to replace instances of objClass with objClass_2 for Application 1 and replace instances of objClass with objClass_3 for Application 2.

Further, in creating a schema map, one or more embodiments of the invention can either expect the user to manually create the schema map or automate the process of generating the schema map. The schema map generation can be automated, for example, on the following lines. One can create a sample input file with the application specific entries to be added to the directory server. Also, one can attempt a pseudo addition of these entries on the directory server and allow the server to analyze the entries and arrive at a specific objectclass for a given entry from the file. Pseudo addition means that the entry would not be added to the server, and it is just used to arrive at the matching objectclass.

Further, a server can find the matching objectclass for a given entry. The server receives a pseudo add operation for an entry, and the server parses the LDAP data interchange format (LDIF) of the entry to be added to get the list of attributes in the entry. If a given entry is an instance of objClass (as per the LDIF provided), the server traverses the list of objectclasses in it's schema from the lowest to highest version (objClass_1, objClass_2 . . . objClass_n) to pick up the objectclass in such a way that the objectclass has all the attributes mentioned in the given entry and the objectclass has the minimal number of required attributes.

For example, an example of an objectclass selection can include the following. Given that the current schema contains the following objectclasses:

```
objectClasses=( objClass_1-oid NAME 'objClass_1' DESC 'A test
objectclass.' SUP top STRUCTURAL MUST ( cn $
newAttr ) MAY ( businessCategory $ description $ member $ o
$ ou $ owner $ seeAlso ) )
objectClasses=( objClass_2-oid NAME 'objClass_2' DESC 'A test
objectclass.' SUP top STRUCTURAL MUST cn MAY
(businessCategory $ description $ member $ o $ ou $ owner $
seeAlso ) ).
```

Given that the entry to be added is:

```
cn=test.o=ibm,c=us
objectclass: objClass
cn: test
description: test user.
```

The server would check if this entry can be added using the base objectclass objClass_1. Objectclass objClass_1 contains the attribute newAttr, which does not appear in "cn=test, o=ibm, c=us". As a result, objClass_1 is discarded.

The server would check if this entry can be added using the objectclass objClass_2. The schema of objClass_2 seems to match the requirements of cn=test,o=ibm,c=us. In the above case it does. Consequently, it can be concluded that objClass_2 is the objectclass to be used for adding the entry "cn=test,o=ibm,c=us".

Once the appropriate objectclass for the given entry is found, one can create a mapping entry under the application specific entry under cn=localhost. Prior to adding the mapping information, one can check if a mapping of this objectclass already exists. If a mapping for a given objectclass already exists, the more generic objectclass, that is, the objectclass containing more optional attributes, would be retained and the other discarded. If there is no mapping for a given objectclass, a new mapping entry would be created on the lines of the information under the section "Objectclass Mapping Information". If no matching objectclass can be found, the operation is discarded for schema violation.

As described herein, one or more embodiments of the invention include LDAP operations once the disclosure is in place. Once a schema map is in place, all operations to the directory server would be intercepted by a schema tailoring routine. The routine would update the entries to conform to the mapping information stored with the server. A similar process is done while sending the results back to the client. The results would be intercepted by a schema tailoring routine to modify the results on the basis of the schema map. With each client request, one would be passing a string (DN of the application in the directory) which acts as an application ID.

FIG. 1 is a flow diagram illustrating techniques for objectclass versioning (for example, configurable objectclass versioning) in directory server schema, according to an embodiment of the present invention. Step 102 includes migrating from one version of a directory server to another version of the directory server. Migrating can include, for example, implementing schema changes. Step 104 includes maintaining one or more versions of an objectclass while migrating from one version of a directory server to another version of the directory server. The versions of the objectclass can be maintained, for example, in a directory server instance. Step 106 includes selecting one of the versions of an objectclass for normal functioning of an application.

The techniques depicted in FIG. 1 can also include, for example, exposing the versions of the objectclass to a customer and having the customer select a version of the objectclass. One or more embodiments of the invention can also include generating and maintaining a per-application map to relate a first objectclass with a second objectclass to replace the first objectclass. Additionally, the techniques depicted in FIG. 1 can also include, for example, querying a schema for a list of one or more versions of one or more objectclasses in an entry and performing a schema conformance check to determine whether a base version of an objectclass from the schema matches the entry.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 2:
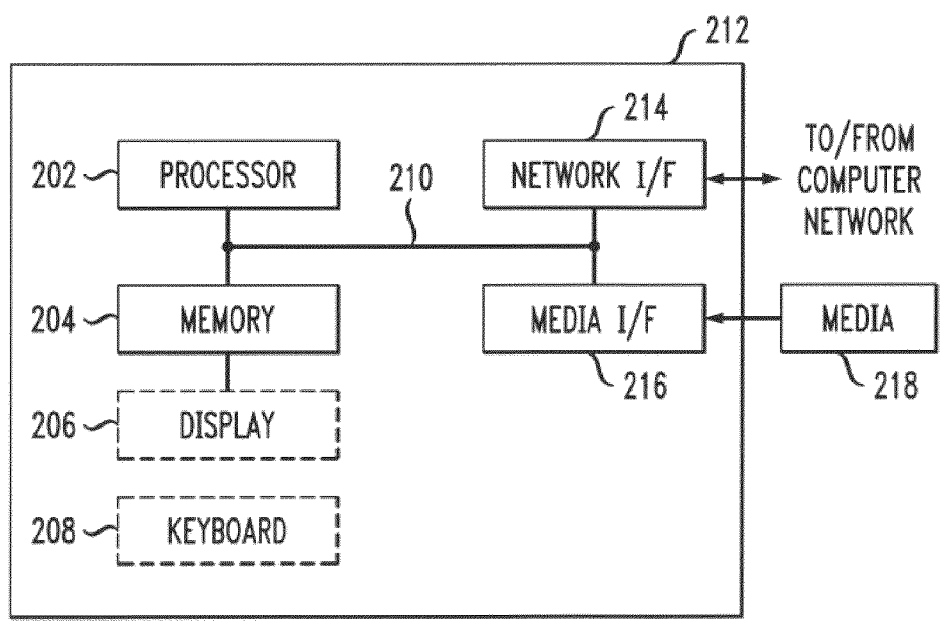
FIG. 2 is a system diagram of an exemplary computer system on which at least one embodiment of the present invention can be implemented.

At present, it is believed that the preferred implementation will make substantial use of software running on a general-purpose computer or workstation. With reference to FIG. 2, such an implementation might employ, for example, a processor 202, a memory 204, and an input and/or output interface formed, for example, by a display 206 and a keyboard 208. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 202, memory 204, and input and/or output interface such as display 206 and keyboard 208 can be interconnected, for example, via bus 210 as part of a data processing unit 212. Suitable interconnections, for example via bus 210, can also be provided to a network interface 214, such as a network card, which can be provided to interface with a computer network, and to a media interface 216, such as a diskette or CD-ROM drive, which can be provided to interface with media 218.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 218) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 204), magnetic tape, a removable computer diskette (for example, media 218), a random access memory (RAM), a read-only memory (ROM), a rigid magnetic disk and an optical disk. Current examples of optical disks include compact disk-read only memory (CD-ROM), compact disk-read and/or write (CD-R/W) and digital versatile disc (DVD).

A data processing system suitable for storing and/or executing program code will include at least one processor 202 coupled directly or indirectly to memory elements 204 through a system bus 210. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 208, displays 206, pointing devices, and the like) can be coupled to the system either directly (such as via bus 210) or through intervening I/O controllers (omitted for clarity).

Network adapters such as network interface 214 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, implementing objectclass versioning at the schema level.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for objectclass versioning in directory server schema, comprising the steps of:
    migrating from one version of a directory server to another version of the directory server;
    maintaining one or more versions of an objectclass while migrating from one version of a directory server to another version of the directory server;
    generating a mapping that associates a first objectclass having a first version in the one or more versions with a second objectclass having a second version in the one or more versions;
    selecting one of the one or more versions of an objectclass on a per-application basis using the mapping such that an application accessing the objectclass is directed to the one of the one or more versions that is compatible with the application;
    receiving a request to add an entry to the directory server schema for the objectclass comprising a number of attributes;
    selecting a version of the objectclass that contains all of the number of attributes; and
    adding the entry to the directory server schema using the version.

2. The method of claim 1, wherein the one or more versions of the objectclass are maintained in a directory server instance.

3. The method of claim 1, wherein objectclass versioning is configurable.

4. The method of claim 1, wherein migrating comprises implementing one or more schema changes.

5. The method of claim 1, further comprising the steps of:
    exposing the one or more versions of the objectclass to a customer; and
    having the customer select a version of the objectclass.

6. The method of claim 1, wherein per-application map entries are stored as directory entries in the directory server schema.

7. The method of claim 1, further comprising the steps of:
    querying a schema for a list of one or more versions of one or more objectclasses in an entry; and
    performing a schema conformance check to determine whether a base version of an objectclass from the schema matches the entry.

8. A computer program product comprising a non-transitory computer readable medium having computer readable program code for objectclass versioning in directory server schema, said computer program product including:
    computer readable program code for migrating from one version of a directory server to another version of the directory server;
    computer readable program code for maintaining one or more versions of an objectclass while migrating from one version of a directory server to another version of the directory server;
    computer readable program code for generating a mapping that associates a first objectclass having a first version in the one or more versions with a second objectclass having a second version in the one or more versions;
    computer readable program code for selecting one of the one or more versions of an objectclass on a per-application basis using the mapping such that an application accessing the objectclass is directed to the one of the one or more versions that is compatible with the application;
    computer readable program code for receiving a request to add an entry to the directory server schema for the objectclass comprising a number of attributes;
    computer readable program code for selecting a version of the objectclass that contains all of the number of attributes; and
    computer readable program code for adding the entry to the directory server schema using the version.

9. The computer program product of claim 8, wherein objectclass versioning is configurable.

10. The computer program product of claim 8, further comprising:
  computer readable program code for exposing the one or more versions of the objectclass to a customer; and
  computer readable program code for having the customer select a version of the objectclass.

11. The computer program product of claim 8, wherein per-application map entries are stored as directory entries in the directory server schema.

12. The computer program product of claim 8, further comprising:
  computer readable program code for querying a schema for a list of one or more versions of one or more objectclasses in an entry; and
  computer readable program code for performing a schema conformance check to determine whether a base version of an objectclass from the schema matches the entry.

13. An apparatus for objectclass versioning in directory server schema, comprising:
  a memory; and
  at least one processor coupled to said memory and operative to:
    migrate from one version of a directory server to another version of the directory server;
    maintain one or more versions of an objectclass while migrating from one version of a directory server to another version of the directory server;
    generate a mapping that associates a first objectclass having a first version in the one or more versions with a second objectclass having a second version in the one or more versions;
    select one of the one or more versions of an objectclass on a per-application basis using the mapping such that an application accessing the objectclass is directed to the one of the one or more versions that is compatible with the application;
    receive a request to add an entry to the directory server schema for the objectclass comprising a number of attributes;
    select a version of the objectclass that contains all of the number of attributes; and
    add the entry to the directory server schema using the version.

14. The apparatus of claim 13, wherein objectclass versioning is configurable.

15. The apparatus of claim 13, wherein the at least one processor coupled to said memory is further operative to:
  expose the one or more versions of the objectclass to a customer; and
  have the customer select a version of the objectclass.

16. The apparatus of claim 13, wherein per-application map entries are stored as directory entries in the directory server schema.

17. The method of claim 1, further comprising:
  updating the one of the one or more versions in the mapping to the version when the version that contains all the attributes is different than the one of the one or more versions.

* * * * *